United States Patent Office 3,636,055
Patented Jan. 18, 1972

3,636,055
4-OXO-19-NOR-A-HOMO-STEROID DIENES AND A PROCESS FOR THEIR MANUFACTURE
Georg Anner, Basel, and Peter Wieland, Oberwil, Basel-Land, Switzerland, assignors to Ciba Corporation, Summit, N.J.
No Drawing. Filed Nov. 26, 1968, Ser. No. 779,256
Claims priority, application Switzerland, Nov. 30, 1967, 16,861/67; June 25, 1968, 17,887/68
Int. Cl. C07d 13/04
U.S. Cl. 260—340.9
17 Claims

ABSTRACT OF THE DISCLOSURE

Compounds of the partial formula

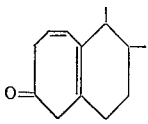

especially those of the androstane, pregnane or cholestane series, and the process of preparing same by reacting a $\Delta^{1,4}$-3-oxo-steroid-diene which in the 10-position carries a reactive esterified hydroxymethyl group with an alkali metal in an aprotic solvent and in the presence of a polycyclic aromatic hydrocarbon and isomerizing the resulting 4-oxo-19-nor-A-homo-2,5(10)-diene.

Use: As intermediates for the manufacture of the known, highly-active 4-oxo-19-nor-A-homo-steroid-1(10)-2,4a-trienes.

---

The subject of the invention are new 4-oxo-19-nor-A-homo-steroid dienes, preferably of the androstane, pregnane or cholestane series, especially 4-oxo-19-nor-A-homo-androstadienes, above all those of general formula

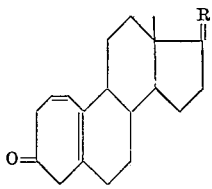

wherein R represents a free or ketalised oxo group, or a free, esterified or etherified hydroxyl group together with a hydrogen atom or a lower aliphatic hydrocarbon, or wherein R represents a hydrogen atom together with the 1,5-dimethyl-hexyl-(1) radical or 4-oxo-19-nor-A-homoandrostadienes, above all those of general formula

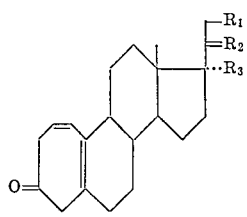

wherein $R_1$ represents hydrogen or a free or esterified hydroxyl group, $R_2$ represents a free or ketalised oxo group, especially the ethylenedioxy group, and $R_3$ represents hydrogen or a free or esterified hydroxyl group, or $R_1$, $R_2$ and $R_3$ together represent a bismethylenedioxy group, and a new process for their manufacture.

An esterified hydroxy group is especially a hydroxyl group which is esterified with an aliphatic, alicyclic, araliphatic or aromatic carboxylic acid having at most 20 carbon atoms, especially with 1–7 carbon atoms, for example with formic, methyl-carbonic, acetic, trifluoracetic, trimethylacetic, propionic, caproic, decanic, undecylenic, hexahydrobenzoic, cyclopenylpropionic, phenylpropionic, benzoic or furanecarboxylic acid. An etherified hydroxyl group is above all a hydroxyl group which is etherified with aliphatic, cycloaliphatic, araliphatic or heterocyclic alcohols such as with tetrahydrofuranyl or tetrahydropyranyl alcohols.

As lower aliphatic hydrocarbons there are especially to be mentioned lower saturated or unsaturated aliphatic residues, for example lower alkyl residues, such as methyl, ethyl, propyl or isopropyl residues, lower alkenyl residues such as vinyl, alkyl or methallyl residues, or lower alkinyl residues such as ethinyl or propinyl residues. The term "lower" used above or in the subsequent text in connection with hydrocarbon residues defines residues having at most 5 chain carbon atoms.

The new compounds are valuable intermediates for the manufacture of the known highly active 4-oxo-19-nor-A-homo-steroid-1(10)-2,4a-trienes.

Particular importance attaches to the compounds of the above formula wherein R represents a keto group or a free hydroxyl group, or hydroxyl group esterified with a lower aliphatic caboxylic acid, together with a hydrogen atom or a lower alkyl residue such as methyl or ethyl, a lower alkenyl residue such as vinyl, allyl or methallyl or a lower alkinyl residue such as ethinyl or propinyl, and those compounds in which $R_1$ denotes hydrogen, $R_2$ a free or ketalised oxo group and $R_3$ a free or esterified hydroxyl group.

The new compounds are obtained if a $\Delta^{1,4}$-3-oxo-steroid-diene which in the 10-position carries a reactively esterified hydroxymethyl group is reacted with an alkali metal in an aprotic solvent and in the presence of a polycyclic aromatic hydrocarbon, the resulting 4-oxo-19-nor-A-homo-steroid-2,5(10)-dienes are isomerised and, if desired, in resulting compounds a ketalised oxo group which is present is liberated and/or an esterified or etherified hydroxyl group is hydrolysed and/or a 17-oxo group which is present is reduced, optionally with the introduction of a lower aliphatic saturated or unsaturated hydrocarbon residue and intermediate protection of the 3-oxo group, and/or a hydroxyl group present in resulting compounds is esterified or etherified.

A reactively esterified hydroxyl group is a hydroxyl group esterified with a strong inorganic or organic acid, especially one which is esterified with hydrohalic acid such as hydrochloric acid or hydrobromic acid or with a sulphonic acid such as methanesulphonic acid or p-toluenesulphonic acid.

The reaction with the alkali metal such as sodium, potassium, but especially lithium, is preferably carried out at a low temperature, for example at −100° to +15°, above all at approximately −40° to −75°. As polycyclic aromatic hydrocarbons there may for example be mentioned: naphthalene, the methyl-naphthalenes, the dimethyl-naphthalenes, phenanthrene, terphenyl, anthracene, acenaphthene, stilbene, fluoranthene and especially diphenyl. Aprotic solvents are those which cannot donate any protons, especially open-chain or cyclic ethers, optionally mixed with one another or with other aprotic solvents. In particular, the following may be used: lower aliphatic ethers such as dimethyl ether, diethyl ether, dipropyl ether, dibutyl ether or diisobutyl ether, ethylene glycol diethyl ethers, for example ethylene glycol dimethyl ether or ethylene glycol diethyl ether, propylene glycol ethers such as propylene glycol dimethyl ether or propylene glycol diethyl ether, acetals such as acetaldehyde-dimethylacetal or acetaldehyde-diethylacetal, dioxan, tetrahydrofuran, tetrahydropyrane, methyltetrahydrofurfuryl ether and similar compounds. Tetrahydrofuran has proved particularly suitable. Furthermore, it is also possible to use, say, aliphatic or aromatic inert hydrocarbons such as hexane, benzene or toluene and hydroaromatic hydrocarbons such as tetralin or Decalin.

The reaction mentioned is preferably carried out in such a way that the alkali metal is allowed to act on a polycyclic aromatic hydrocarbon in an aprotic solvent at room temperature, preferably under nitrogen, during the course of which the metal dissolves. The solution is then cooled to a temperature lying within the above-mentioned range, the steroid is added and the mixture allowed to react in the cold.

The isomerisation of 4-oxo-19-nor-A-homo-steroid-2,5(10)-dienes which may be obtained, to give the corresponding 1,5(10)-dienes takes place in the usual manner, for example by reaction with acid or basic reagents or by adsorption on Florisil (magnesium silicate).

Esterified or etherified hydroxyl groups or ketalised oxo groups present in the resulting process products may, if desired, be split off according to processes which are in themselves known, for example hydrolytically. A free oxo group in the 17-position can be selectively reduced to the 17-hydroxyl group by reduction with, for example, a complex light metal hydride, especially an alkali metal borohydride or lithium-tri-tert.-butoxy-aluminum hydride. The group can however also be reduced with a metal derivative, especially a Grignard compound or an alkali metal derivative, such as a lithium or sodium derivative, of a lower aliphatic compound to give the 17α-substituted 17β-hydroxy compounds. The conversion of the 17-oxo group is preferably effected with intermediate protection of the 3-oxo group, by temporarily converting the 3-oxo group into a 3-enol ester of 3-enol ether. These can then again be decomposed in the usual manner, for example hydrolytically. A free hydroxyl group can be esterified or etherified in the usual manner, especially with the above-mentioned acids, their anhydrides or halides, or with the alcohols mentioned. In the course of this the 3-oxo group is in most cases simultaneously converted to the 3-enolate or the 3-enol ether, and these can again be selectively decomposed.

The starting substances to be used according to the invention are known or can be obtained in a manner which is in itself known, for example by esterification of the 19-hydroxy-3-oxo-Δ$^{1,4}$-dienes or by dehydrogenation of 19-respectively esterified 3-oxo-Δ$^4$-enes by means of dichlorodicyanobenzoquinone.

As mentioned above, the new end products can easily be converted into the known highly active 4-oxo-19-nor-A-homo-steriod-1(10),2,4α-trienes, for example by brominating the resulting 4-oxo-steroid-1,5(10)-dienes in the presence of a basic reagent such as a tertiary amine, especially a cyclic tertiary amine, for example pyridine, piperidine, collidine or quinoline, and, if desired, liberating etherified or esterified hydroxyl groups and/or ketalised oxo groups in resulting compounds.

The invention also relates to those embodiments of the process which start from a compound obtainable as an intermediate at any stage and in which the missing process stages are carried out or in which a starting substance is formed under the reaction conditions or is used in the form of a salt or other derivatives.

The following examples illustrate the invention without however restricting it in any respect.

EXAMPLE 1

A mixture of 150 ml. of absolute tetrahydrofuran, 450 mg. of lithium and 9 g. of diphenyl is stirred for 2 hours at room temperature in a stream of nitrogen. Thereafter the deep blue solution is cooled to −70° C. and 6 g. of 3-oxo-17 - ethylenedioxy - 19 - mesyloxy-Δ$^{1,4}$-androstadiene, are added, rinsed in with a little tetrahydrofuran. After 30 minutes stirring at −65 to −70° C. 100 ml. of saturated ammonium chloride solution are added and the mixture is extracted three times with benzene. The organic solutions are washed with water containing sodium chloride, dried and evaporated in vacuo and the residue thereof, dissolved in toluene, is adsorbed on 300 g. of Florisil, rinsing with 1.2 l. of toluene. In order to displace the double bond from the 2-position to the 1-position the crude product is left on the solum for 2 hours. Thereafter the 4-oxo-17-ethylenedioxy-A-homo-Δ$^{1,5(10)}$-19-norandrostadiene is eluted with toluene-ethyl acetate (95:5) mixture, and 2.04 g. of the material, of melting point 115–116° C., are obtained after crystallisation from an ether-petroleum ether mixture. A further 0.12 g. of the same compound are obtained from the mother liquor.

Crystallisation from an ether-petroleum ether mixture of the later fractions eluted with a toluene-ethyl acetate (95:5) mixture yields 240 mg. of 3 - oxo-17-ethylenedioxy-5,19-cyclo-Δ$^1$-androstene which after renewed recrystallisation melts at 145.5–147° C. A further 200 mg. of starting material are eluted with pure ethyl acetate.

The 3 - oxo - 17 - ethylenedioxy - 19-mesyloxy-Δ$^{1,4}$-androstadiene required as the starting material is manufactured as follows:

A mixture of 56 g. of 3,17 - dioxo-19-mesyloxy-Δ$^4$-androstene, 42 g. of dichlorodicyanobenzoquinone and 840 ml. of dioxan is boiled for 18 hours under reflux in a stream of nitrogen. After cooling the solids are filtered off and rinsed with methylene chloride. The residue of the filtrate which has been evaporated in vacuo, dissolved in methylene chloride, is filtered through 420 g. of aluminum oxide (activity II), rinsing with 4.2 l. of a toluene-ethyl acetate (1:1) mixture. After evaporation in vacuo the residue is recrystallised from a methylene chloride-ether mixture. 42 g. of 3,17-dioxo-19-mesyloxy-Δ$^{1,4}$-androstadiene of melting point 203.5–204.5° C. (decomposition) are thereby obtained.

A solution of 42.12 g. of the diene obtained above and 910 mg. of p-toluenesulphonic acid in 2.1 l. of benzene and 23 ml. of ethylene glycol is boiled for 4 hours with good stirring, and using a water separator.

After cooling and adding 63 ml. of pyridine, the material is washed with 420 ml. of saturated sodium hydrogen carbonate solution and with water. The aqueous solutions are extracted once more with toluene, after which the organic solutions are dried and evaporated in vacuo. Crystallisation of the residue from methylene chloride yields 37.85 g. of 3-oxo-17-ethylenedioxy-19-mesyloxy-Δ$^{1,4}$-androstadiene of melting point 169–170° C. (decomposition).

EXAMPLE 2

1.5 g. of the 4-oxo-17-ethylenedioxy-A-homo-Δ$^{1,5(10)}$-19-norandrostadiene obtained in Example 1 are warmed in a stream of nitrogen to 60° C. with a mixture of 20 ml. of glacial acetic acid and 2 ml. of water over the course of 20 minutes. Thereafter the mixture is evaporated in vacuo and dissolved in toluene, and filtered through 75 g. of Florisil, rinsing with 2 l. of a toluene-ethyl acetate (9:1) mixture. After recrystallising the residue of the filtrate which has been evaporated in vacuo from an ether-petroleum ether mixture, 990 mg. of 4,17-dioxo-A-homo-Δ$^{1,5(10)}$-19-norandrostadiene of melting point 108–111° C. are obtained.

EXAMPLE 3

90 mg. of lithium are added to a solution of 1.8 g. of diphenyl in 30 ml. of tetrahydrofuran and the mixture is stirred for 2 hours in a stream of nitrogen at room temperature. Thereafter the deep blue solution is cooled to −70° C. and 1 g. of 3-oxo-17α-methyl-17β-hydroxy-19-chlor-Δ$^{1,4}$-androstadiene are added, rinsed down with a little tetrahydrofuran. After 45 minutes stirring at −65 to −70° C. 20 ml. of saturated ammonium chloride solution are added and the mixture is repeatedly extracted with toluene. The residue from washing the organic solutions with dilute sodium chloride solution, drying and evaporating in vacuo is dissolved in toluene and adsorbed on 60 g. of Florisil, rinsing with a total of 240 ml. of toluene. After 17 hours the 4-oxo-17α-methyl-17β-hydroxy-A-homo-Δ$^{1,5(10)}$-19-norandrostadiene is eluted with a toluene-ethyl acetate (97:3) mixture. After crystallisation from an ether-petroleum ether mixture 292 mg. are obtained, which after renewed recrystallisation melt at 120–122° C.

The 3-oxo-17α-methyl - 17β - hydroxy-19-chlor-Δ$^{1,4}$-androstadiene used as the starting material is manufactured as follows:

64 ml. of a 3 M solution of methylmagnesium chloride in tetrahydrofuran are added to a mixture of 19 g. of 3-ethoxy-17-oxo-19-chlor-Δ$^{3,5}$-androstadiene and 200 ml. of tetrahydrofuran, whilst stirring and cooling in ice. After 1½ hours stirring at room temperature the material is poured onto 500 ml. of saturated ammonium chloride solution and ice, whilst stirring, and is repeatedly extracted with toluene. The organic solutions are washed with saturated ammonium chloride solution, dried and evaporated in vacuo. Since according to the infra-red spectrum the residue thus obtained still contains starting material, it is again reacted with 50 ml. of 3 M methylmagnesium chloride in tetrahydrofuran in the manner described above. The crude 3 - ethoxy - 17α - methyl - 17-hydroxy-19-chlor-Δ$^{3,5}$-androstadiene thus obtained is used for the next step without further purification. A pure product of melting point 138–141.5° C. can be obtained by crystallisation from alcohol.

In order to hydrolyse the enol-ether grouping the crude product is stirred for 24 hours with 200 ml. of 90% strength acetic acid in a stream of nitrogen. Thereafter the mixture is poured into 3 l. of saturated sodium hydrogen carbonate solution and repeatedly extracted with methylene chloride. The organic solutions are washed with dilute sodium chloride solution, dried and evaporated in vacuo. Chromatography of the residue on 950 g. of Florisil and crystallisation from ether of the fractions eluted with toluene-ethyl acetate (95:5) and (9:1) mixtures yields 12.75 g. of 3-oxo-17α-methyl-17β-hydroxy-19-chlor-Δ$^4$-androstene of melting point 106–109° C.

12.75 g. of the 3-oxo compound obtained above, 10 g. of dichloro-dicyanobenzoquinone and 190 ml. of dioxan are boiled for 20 hours under reflux in a stream of nitrogen. After cooling, filtering and rinsing with toluene and methylene chloride, the residue of the filtrate which has been evaporated in vacuo is chromatographed on 390 g. of aluminium oxide (activity II). The fractions eluted with toluene-ethyl acetate (99:1) and 49:1) mixtures on crystallisation from a methylene chloride-ether mixture yield 10 g. of 3-oxo-17α-methyl-17β-hydroxy-19-chlor-Δ$^{1,4}$-androstadiene of melting point 193–194° C.

EXAMPLE 4

7.40 ml. of a 1.16 N solution of bromine in carbon tetrachloride are added with stirring to a solution of 656 mg. of 4-oxo - 17 - ethylenedioxy-A-homo-Δ$^{1,5(10)}$-19-norandrostadiene in 60 ml. of pyridine, and the mixture is allowed to stand for 6 hours at room temperature. It is then poured into 110 ml. of N sodium hydroxide solution and extracted three times with ether. The ethereal solutions are repeatedly washed with N sodium hydroxide solution and water, dried and evaporated in vacuo with addition of methylene chloride. On preparative thin layer chromatography of the residue on silica gel in the toluene-acetone (4:1) system (8 plates of 1 m.) two main zones are obtained, and these are scraped off and eluted with a toluene-methanol (4:1) mixture. The eluates are washed with water, dried and evaporated in vacuo. 200 mg. of 4 - oxo-17-ethylenedioxy-A-homo-Δ$^{1(10),2,4a}$-19nor-androstatriene are obtained from the upper zone after crystallisation from ether, and after further recrystallisation from a methylene chloride-ether mixture the material melts at 176.5–178° C. The lower zone after crystallisation from ether yields 160 mg. of a compound of the same constitution as that of the upper zone. The compound is however still substituted by a bromine atom in ring A. Melting point 116–122° C., with decomposition.

EXAMPLE 5

90 mg. of lithium are added to a solution of 1.8 g. of diphenyl in 30 ml. of tetrahydrofuran whilst stirring in a stream of nitrogen. After 2½ hours stirring the deep blue solution is cooled to −70° C. and 1 g. of 3-oxo-17α-ethinyl-17β-hydroxy-19-chlor-Δ$^{1,4}$-androstadiene in 10 ml. of tetrahydrofuran is added thereto over the course of 10 minutes, rinsing down with 4 ml. of tetrahydrofuran. The reaction solution is stirred for 45 minutes at −75 to −70° C. and 20 ml. of saturated ammonium chloride solution are then added. The mixture is then repeatedly extracted with toluene, washed with saturated ammonium chloride solution, dried and evaporated in vacuo. The residue, dissolved in toluene, is adsorbed in 50 g. of Florisil, rinsing with a total of 240 ml. of toluene. 20 hours later the 4-oxo-17α-ethinyl-17β-hydroxy-A-homo-Δ$^{1,5(10)}$-19-nor-androstadiene is eluted with a toluene-ethyl acetate (19:1) mixture. A crystalline slightly yellow-coloured residue is obtained which after recrystallisation from a methylene chloride-ether mixture melts at 193–195.5° C.

The 3-oxo-17α-ethinyl-17β-hydroxy - 19 - chlor-Δ$^{1,4}$-androstadiene required as the starting material is manufactured as follows:

Acetylene is passed for 30 minutes into 1.6 l. of absolute tetrahydrofuran. Thereafter 2 l. of an 0.36 M solution of methylmagnesium chloride in tetrahydrofuran is allowed to run in over the course of 25 minutes with continued introduction of acetylene and stirring. After a further half hour the stream of acetylene is stopped and replaced by a gentle stream of nitrogen. 20 g. of 3-ethoxy-17-oxo-19-chlorΔ$^{3,5}$-androstadiene are added to the ethinylmagnesium chloride solution thus prepared, rinsing down with 40 ml. of tetrahydrofuran. Two hours later 300 ml. of saturated ammonium chloride solution are added, whilst cooling. Working up is effected by extraction with toluene and washing with saturated ammonium chloride solution. In order to decompose the enol-ether the residue is warmed for 15 minutes to 100° C. with 200 ml. of 90% strength acetic acid, in a stream of nitrogen. The residue from the evaporation of the reaction solution in vacuo is chromatographed on 1 kg. of Florisil. The fractions eluted with a toluene-ethyl acetate (49:1) mixture on crystallisation from methylene chloride-ether-petroleum ether yield 13.72 g. of 3-oxo-17α-ethinyl-17β-hydroxy-19-chlor-Δ$^4$-androstene of melting point 161.5–163° C.

A mixture of 12 g. of the ethinylcarbinol obtained above, 12 g. of dichlorodicyanobenzoquinone and 240 ml. of dioxan is boiled under reflux in a stream of nitrogen for 22 hours. It is then cooled and the solids filtered off and rinsed with toluene and methylene chloride. The residue from evaporating the filtrate in vacuo is chromatographed on 360 g. of aluminium oxide (activity II). Crystallisation of the fractions eluted with a toluene-ethyl acetate (9:1) mixture from a methylene chloride-ether-petroleum ether mixture yields 10.12 g. of 3-oxo-17α-ethinyl-17β-hydroxy-19-chlor-Δ$^{1,4}$-androstadiene of melting point 230–233° C.

EXAMPLE 6

A mixture of 300 ml. of absolute tetrahydrofuran, 18 g. of diphenyl and 900 mg. of lithium is stirred for 4 hours at room temperature. The deep blue solution is then cooled to −70° C. and a solution of 8 g. of 3-oxo-17α-hydroxy-19-mesyloxy-20-ethylenedioxy-Δ$^{1,4}$-pregnadiene in 100 ml. of absolute tetrahydrofuran is run in dropwise over the course of 10 minutes, rinsing down with 40 ml. of tetrahydrofuran. After 45 minutes stirring at −70° C., 200 ml. of saturated ammonium chloride solution are added and the mixture extracted three times with toluene. The organic solutions are washed with saturated ammonium chloride solution, dried and evaporated in vacuo. The residue, dissolved in toluene, is adsorbed on 400 g. of Florisil, rinsing down with 1.8 l. of toluene. 16 hours later the 4-oxo-17α-hydroxy-20-ethylenedioxy-A-homo-Δ$^{1,5(10)}$-19-nor-pregnadiene is eluted with a toluene-ethyl acetate (19:1) mixture. After crystallisation from a methylene chloride-ether-petroleum ether mixture 1.44 g. of melting point 121.5–123° C. are obtained. The later fractions eluted with a toluene-ethyl acetate (19:1) mixture on crystallisation from an ether-petroleum ether mixture yield 281 mg. of a compound of melting point 171–173° C., which on the basis of its physical data probably has the constitution of 4-oxo-17α-hydroxy-20-ethylenedioxy-A-homo-Δ$^{1,5}$-19-nor-pregnadiene. Finally the 4-oxo-17α-hydroxy-20-ethylenedioxy-5,19-cyclo-Δ$^{1,6}$ - pregnadiene is eluted with a toluene-ethyl acetate (9:1) mixture and 137 mg. of this substance, of melting point 181–187° C., are obtained after crystallisation from ether. It is still contaminated with small quantities of the Δ$^{1,5}$-diene described above.

60 ml. of 90% strength acetic acid are warmed to 60° C. and 1.34 g. of the 4-oxo-17α-hydroxy-20-ethylenedioxy-A-homo-Δ$^{1,5(10)}$-19-nor-pregnadiene obtained above are then added, rinsing down with 7.5 ml. of 90% strength acetic acid. The reaction solution is left for 20 minutes in a stream of nitrogen in a bath at 60° C. It is then cooled, poured into saturated sodium hydrogen carbonate solution and extracted with methylene chloride. After drying and evaporation, crystallisation of the residue from a methylene chloride-ether-petroleum ether mixture yields 987 mg. of 4.20-dioxo-17α-hydroxy-A-homo-Δ$^{1,5(10)}$-19-nor-pregnadiene of melting point 153–154.5° C.

This material together with 1 g. of p-toluenesulphonic acid is dissolved in 10 ml. of acetic anhydride, after which the mixture is placed in a bath at 40° C. for 2½ hours. The mixture is then poured into 500 ml. of water and 5 ml. of pyridine and extracted three times with ether. The organic solutions are washed with dilute hydrochloric acid, water, sodium hydrogen carbonate solution and water, dried and evaporated in vacuo with addition of methylene chloride.

The crude 4,17α-diacetoxy-20-oxo-A-homo-Δ$^{1,3,5(10)}$-19-nor-pregnatriene thus obtained is dissolved in 50 ml. of methanol, after which a solution of 250 mg. of potassium carbonate in 1.25 ml. of water is added. After 5 hours stirring in a stream of nitrogen the mixture of 0.25 ml. of glacial acetic acid in 2.5 ml. of water is added and the mixture evaporated in vacuo. The residue is treated with methylene chloride after which it is washed with water and again evaporated in vacuo. On chromatography of the residue on 100 g. of Florisil, the fractions eluted with toluene-ethyl acetate (19:1) and (9:1) mixtures on crystallisation from a methylene chloride-ether-petroleum ether mixture yield 283 mg. of 4,20-dioxo-17α-acetoxy-A-homo-Δ$^{1,5(10)}$-19-nor-pregnadiene of melting point 156–157° C. A further 121 mg. of the same compound are obtained from the mother liquor.

The 3-oxo-17α-hydroxy-19-mesyloxy-20-ethylenedioxy-Δ$^{1,4}$-pregnadiene required as the starting material is manufactured as follows:

A mixture of 41.15 g. of 3,20-dioxo-17α-acetoxy-19-hydroxy-Δ$^4$-pregnene and 410 ml. of pyridine is treated with 40 ml. of methanesulphonyl chloride whilst cooling with an ice-methanol mixture and stirring. After 80 hours standing at −10° C. the mixture is stirred with ice for 30 minutes and is then extracted with methylene chloride. The organic phases are washed with water, dried and evaporated in vacuo. In order to remove residual pyridine the material is dissolved in toluene and again evaporated in vacuo. On crystallisation from a methylene chloride-ether mixture 47.2 g. of 3,20-dioxo-17α-acetoxy-19-mesyloxy-Δ$^4$-pregnene of melting point 179–181° C., with decomposition, are obtained.

The mesylate thus obtained is boiled with 35.4 g. of dichlorodicyanobenzoquinone and 950 ml. of dioxan for 21 hours whilst stirring in a stream of nitrogen. After cooling the solids are filtered off, rinsed with toluene, and the filtrate evaporated in vacuo. The residue, dissolved in toluene, is filtered through 700 g. of aluminium oxide (activity II), rinsing with 8 l. of toluene-ethyl acetate (9:1) mixture, 5 l. of (4:1) mixture and 5 l. of (7:3) mixture. After evaporating the combined filtrates the product is recrystallised from a methylene chloride-ether mixture, whereupon 29.8 g. of 3,20-dioxo-17α-acetoxy-19-mesyloxy-Δ$^{1,4}$-pregnadiene of melting point 174–175° C., with decomposition, are obtained.

In order to saponify the 17α-acetoxy group the material is stirred for 39 hours in a stream of nitrogen with 465 ml. of methanol and 52 ml. of a 1 N solution of potassium hydroxide in methanol. A further 40 ml. of 1 N potassium hydroxide solution in methanol are then added and the mixture warmed to 30–35° C. for 30 minutes. After a further 2½ hours 6 ml. of glacial acetic acid are added and the mixture poured into 2 l. of water whilst stirring. The oil which has separated out becomes solid after some time, after which it is filtered off, washed with water and dried in a vacuum desiccator over phosphorus pentoxide. The yield is 20.9 g. After twice recrystallising a sample from a methylene chloride-ether mixture, the 3,20-dioxo-17α-hydroxy-19-mesyloxy-Δ$^{1,4}$-pregnadiene thus obtained melts at 165.5–166.5° C.

20 g. of the crude 17α-hydroxy compound thus obtained are boiled for 5 hours with 1.35 l. of benzene, 13.5 ml. of ethylene glycol and 520 mg. of p-toluenesulphonic acid, using a water separator. After cooling and adding 32 ml. of pyridine, sodium hydrogen carbonate solution is added, the mixture extracted with toluene, and the extract washed with water, dried and evaporated in vacuo. On chromatography of the residue on 1 kg. of Florisil, toluene-ethyl acetate (4:1) and (7:3) mixtures initially elute the 3-oxo-17α-hydroxy - 19 - mesyloxy-20-ethylenedioxy-Δ$^{1,4}$-pregnadiene, of which 13.42 g. of melting point 170.5–171° C. are obtained after crystallisation from a methylene chloride-ether mixture. The fractions eluted with a toluene-ethyl acetate (1:1) mixture on crystallisation from a methylene chloride-ether mixture yield 2.15 g. of 3,20-dioxo-17α-acetoxy-19-mesyloxy-Δ$^{1,4}$-pregnadiene.

EXAMPLE 7

Acetylene is introduced into 320 ml. of absolute tetrahydrofuran for 30 minutes, whilst stirring. 400 ml. of an 0.36 N solution of methylmagnesium chloride are then allowed to run in over the course of 15 minutes, whilst continuing to introduce acetylene. After a further 10 minutes the stream of acetylene is stopped and 4-acetoxy - 17-oxo-A-homo - Δ$^{1,3,5(10)}$ - 19-nor-androstatriene, manufactured from 4 g. of 4-oxo-17-ethylenedioxy-A-homo-Δ$^{1,5(10)}$-19-nor-androstadiene according to Example 8, dissolved in 40 ml. of tetrahydrofuran, are added whilst stirring and in a stream of nitrogen. 20 ml. of tetrahydrofuran are used for rinsing and the mixture stirred for 2 hours at room temperature. Saturated ammonium chloride solution is then added whilst cooling, the mixture extracted with toluene, and the extract washed with saturated ammonium chloride solution, dried and evaporated in vacuo. In order to completely saponify the 4-acetoxy group the residue is dissolved in 150 ml. of methanol and a solution of 750 mg. of potassium carbonate in 3.75 ml. of water is added whilst stirring. 5 hours later the mixture is neutralised with 7.5 ml. of 10% strength acetic acid and largely evaporated in vacuo. The residue is treated with methylene chloride, washed with water and dilute sodium chloride solution, dried and evaporated in vacuo. On chromatography of the residue on 200 g. of Florisil, the fractions eluted with a toluene-ethyl acetate (95:5) mixture after crystallisation from a methylene chloride-ether mixture yield 1.1 g. of the 4-oxo-17α-ethinyl-17β-hydroxy-A-homo - Δ$^{1,5(10)}$ - 19-nor-androstadiene of melting point 192–195° C. described in Example 5. A further 164 mg. of the same compound can be obtained from the mother liquor.

EXAMPLE 8

A solution of 4 g. of 4-oxo-17-ethylenedioxy-A-homo-$\Delta^{1,5(10)}$-19-nor-androstadiene and 4 g. of p-toluenesulphonic acid in 40 ml. of acetic anhydride is placed in a bath at 40° C. for 2½ hours. It is then poured into a solution of 80 g. of sodium acetate in 1 litre of water whilst stirring and cooling in ice. After 30 minutes the mixture is extracted with methylene chloride, and the extract washed with sodium hydrogen carbonate solution, dried and evaporated in vacuo. The crude 4-acetoxy-17-ethylenedioxy-A-homo-$\Delta^{1,3,5(10)}$-19-nor-androstatriene is treated with 32 ml. of glacial acetic acid and 8 ml. of water in a nitrogen atmosphere and placed in a bath at 100° C. for 10 minutes. The mixture is then evaporated in vacuo, dissolved in toluene and again evaporated in vacuo. The brown residue, dissolved in toluene, is filtered through 40 g. of Florisil, rinsing with 1.8 litres of a toluene-ethyl acetate (49:1) mixture. After evaporation in vacuo the crude 4-acetoxy-17-oxo-A-homo-$\Delta^{1,3,5(10)}$-19-nor-androstatriene is obtained in the form of a yellow oil. This is dissolved in 80 ml. of absolute ether and treated with 50 ml. of a 3 N methylmagnesium chloride solution in tetrahydrofuran whilst stirring and cooling in ice. After 2 hours stirring at room temperature saturated sodium potassium tartrate solution is added whilst cooling with ice-methanol, and the mixture is repeatedly extracted with ether. The residue from washing the ether solutions with saturated sodium potassium tartrate solution, drying and evaporating in vacuo is chromatographed on 200 g. of Florisil. The 4-oxo-17α-methyl-17β-hydroxy-A-homo-$\Delta^{1,5(10)}$-19-nor-androstadiene described in Example 3 is eluted with a toluene-ethyl acetate (97:3) mixture, 1.68 g. of the compound being obtained after recrystallization from an ether-pentane mixture.

EXAMPLE 9

A solution of 1.5 g. of 4-oxo-17α-ethinyl-17β-hydroxy-A-homo-$\Delta^{1,5(10)}$-19-nor-androstadiene in 50 ml. of pyridine and 50 ml. of acetic anhydride is warmed to 70° C. in a nitrogen atmosphere for 90 hours. It is then evaporated in vacuo, dissolved in xylene and again evaporated in vacuo. The residue is chromatographed on 75 g. of Florisil, whereupon the 3,17β-diacetoxy-17α-ethinyl-A-homo-$\Delta^{1,3,5(10)}$-19-nor-androstatriene is eluted with toluene. After crystallisation from an ether-petroleum-ether mixture 824 mg. are obtained, melting at 141–145.5° C. after renewed recrystallisation.

EXAMPLE 10

A mixture of 5.4 g. of diphenyl, 270 mg. of lithium and 90 ml. of tetrahydrofuran is stirred under a current of nitrogen for 4 hours at room temperature. To the deep blue solution, cooled to −70° C., are then added 3.4 g. of 3-oxo-19-mesyloxy-$\Delta^{1,4}$-cholestadiene the vessel being rinsed with 5 ml. of tetrahydrofuran. 45 minutes later, 60 ml. of saturated ammonium chloride solution are added and the batch extracted with toluene, the extract washed with water containing sodium chloride, dried and evaporated under vacuum. In a 1:4 toluene+petroleum ether solution, the residue is adsorbed on 180 g. of Florisil and the diphenyl eluted with a total of 1440 ml. of a 1:4 mixture of toluene and petroleum ether. 15 hours later, the 4-oxo-α-homo-$\Delta^{1,5(10)}$-19-nor-cholestadiene is eluted with toluene and toluene+ethyl acetate (49:1). It is obtained in the form of a yellow-colored oil which in the IR spectrum (with the use of methylene chloride as solvent) exhibits a keto band at 5.85δ.

The 3-oxo-19-mesyloxy-$\Delta^{1,4}$-cholestadiene used as starting material is prepared as follows:

A solution of 10.81 g. of 3β-acetoxy-19-hydroxy-$\Delta^5$-cholestene in 135 ml. of pyridine is treated, while cooling with an ice-methanol mixture, with 13.5 ml. of methanesulfonyl chloride. The mixture is allowed to stand at −10° C. for 16 hours, then poured into a mixture of 300 ml. of saturated sodium bicarbonate solution and 200 ml. of 5% sodium chloride solution, and extracted three times with methylene chloride. The organic solutions are washed with saturated sodium bicarbonate solution and water, dried and evaporated under reduced pressure. Recrystallisation of the residue from a mixture of methylene chloride, ether and petroleum ether produces 9.4 g. of 3β-acetoxy-19-mesyloxy-$\Delta^5$-cholestene of melting point 144.5–146° C. Another 1.47 g. of the same compound can be obtained from the mother liquor.

To 9.3 g. of a solution of the mesylate obtained as described above in 71 ml. of dioxan and 74 ml. of methanol are added 16.3 ml. of N-potassium hydroxide solution. The batch is stirred for 2 hours, then treated with 1.9 ml. of glacial acetic acid and water, filtered and washed with water. The filter residue is dissolved in methylene chloride, dried and evaporated in vacuo. Crystallisation from a methylene chloride+ether+petroleum ether mixture gives 7.78 g. of 3β-hydroxy-19-mesyloxy-$\Delta^5$-cholestene melting at 128–129° C. Further crystallisation raises the melting point to 129.5–130° C.

7.74 g. of the hydroxy compound obtained as described above are dissolved in 300 ml. of acetone and the solution is stirred at 0° C. while 6 ml. of an 8 N-solution of chromic acid in dilute sulfuric acid are added. 15 minutes later, 400 mg. of sodium acetate and water are added and the batch extracted several times with methylene chloride. The organic solutions are washed with saturated sodium bicarbonate solution and water, dried and evaporated under vacuum.

In order to shift the double bond from the 5,6-position to the 4,5-position, the crude 3-oxo-19-mesyloxy-$\Delta^5$-cholestene is treated with a solution of 750 mg. of β-toluenesulfonic acid in 180 ml. of acetone. The mixture is allowed to stand at room temperature for 16 hours in a nitrogen atmosphere and then poured into a dilute sodium bicarbonate solution, and the whole extracted several times with methylene chloride. The residue is chromatographed over 350 g. of silica gel, and from the fractions eluted with 9:1 and 4:1 mixtures of toluene and ethyl acetate, 6.5 g. of pure 3-oxo-19-mesyloxy-$\Delta^4$-cholestene are obtained in the form of a yellow oil.

A mixture of 5.5 g. of the resulting $\Delta^4$-3-oxo compound with 110 ml. of dioxan and 4.12 g. of dichlorodicyanbenzoquinone is refluxed under nitrogen for 22 hours. The mixture is then cooled, filtered with suction, washed with toluene and the filtrate evaporated under vacuum, the residue is dissolved in toluene+ethyl acetate (4:1) and the solution filtered through 85 g. of alumina (activity II). The filtrate is evaporated and the residue crystallized from a mixture of methylene chloride+ether+petroleum ether and 3.02 g. of 3-oxo-19-mesyloxy-$\Delta^{1,4}$-cholestadiene obtained which melts at 139–141° C.

What is claimed is:

1. Process for the manufacture of 4-oxo-19-nor-A-homo-steroid-dienes, wherein a $\Delta^{1,4}$-3-oxo-steroid-diene of the androstane, pregnane or cholestane series which in the 10-position carries a hydroxymethyl group esterified with a hydrohalic acid or a sulfonic acid is reacted with an alkali metal in an aprotic solvent and in the presence of a polycyclic aromatic hydrocarbon and the resulting 4-oxo-19-nor-A-homo-steroid-2,5-(10)-diene is isomerized with a member selected from the group consisting of an acid agent, basic agent, and an adsorption agent of magnesium silicate.

2. Process according to claim 1, wherein a $\Delta^{1,4}$-3-oxo-steroid-diene of the androstane, pregnane or cholestane series is used as starting material which carries in the 10-position a hydroxymethyl group esterified with methanesulfonic acid or para-toluene-sulfonic acid or with hydrochloric acid.

3. Process as claimed in claim 1, wherein lithium is used as alkali metal.

4. Process according to claim 1, wherein the reaction with the alkali metal is performed at −40 to −75° C.

5. Process according to claim 1, wherein diphenyl is used as the polycyclic aromatic hydrocarbon.

6. Process according to claim 1, wherein the alkali metal is dissolved in an aprotic solvent and a polycyclic aromatic hydrocarbon at room temperature, the solution is cooled, and the $\Delta^{1,4}$-3-oxo-steroid-diene which in the 10-position carries a hydroxymethyl group esterified with a hydrohalic acid or a sulfonic acid is added and the whole allowed to react at $-40°$ to $-75°$ C.

7. Process according to claim 1, wherein a $\Delta^{1,4}$-3-oxo-androstadiene which carries in the 10-position a hydroxymethyl group esterified with a hydrohalic acid or a sulfonic acid is used as starting material.

8. Process according to claim 7, wherein there is used as starting material a $\Delta^{1,4}$-3-oxo-androstadiene of the formula

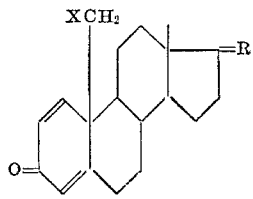

in which X represents a hydroxy group esterified with a hydrohalic acid or a sulfonic acid and R an oxo or ethylenedioxy group, a free or esterified hydroxy group together with a hydrogen atom or a lower aliphatic hydrocarbon.

9. Process according to claim 8, wherein there is used as starting material a compound of the formula shown in claim 8, wherein R represents a keto or ethylenedioxy group, a free hydroxyl group or a hydroxyl group esterified with an aliphatic carboxylic acid together with a hydrogen atom or a lower alkyl, alkenyl or alkinyl radical.

10. Process according to claim 9, wherein a 3-oxo-17-ethylenedioxy-$\Delta^{1,4}$-androstadiene which in the 10-position carries a hydroxymethyl group esterified with a hydrohalic acid or a sulfonic acid is used as starting material.

11. Process according to claim 9, wherein a 3-oxo-17α-methyl-17β-hydroxy-$\Delta^{1,4}$-androstadiene which in the 10-position carries a hydroxymethyl group esterified with a hydrohalic acid or a sulfonic acid is used as starting material.

12. Process according to claim 9, wherein a 3-oxo-17α-ethinyl-17β-hydroxy-$\Delta^{1,4}$-androstadiene which in the 10-position carries a hydroxymethyl group esterified with a hydrohalic acid or a sulfonic acid is used as starting material.

13. Process according to claim 1, wherein a $\Delta^{1,4}$-3-oxo-pregnadiene which in the 10-position carries a hydroxymethyl group esterified with a hydrohalic acid or a sulfonic acid is used as starting material.

14. Process according to claim 13, wherein there is used as starting material a compound of the formula

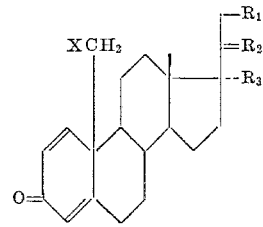

in which X represents a hydroxy group esterified with a hydrohalic acid or a sulfonic acid, $R_1$ and $R_3$ each stands for a hydrogen atom or a free or esterified hydroxy group, and $R_2$ for an oxo or ethylenedioxy group, and $R_1$, $R_2$ and $R_3$ together represent a bismethylenedioxy group.

15. Process according to claim 14, wherein there is used as starting material a compound of the formula shown in claim 14, in which $R_1$ represents a hydrogen atom, $R_2$ stands for an oxo or ethylenedioxy group, and $R_3$ for a free or esterified hydroxy group.

16. Process according to claim 15, wherein a 3-oxo-17α-hydroxy-20-ethylenedioxy-$\Delta^{1,4}$-pregnadiene which carries in 10-position a hydroxymethyl group esterified with a hydrohalic acid or a sulfonic acid is used as starting material.

17. Process according to claim 1, wherein a 3-oxo-$\Delta^{1,4}$-cholestadiene which in 10-position carries a hydroxymethyl group esterified with a hydrohalic acid or a sulfonic acid is used as starting material.

References Cited

UNITED STATES PATENTS 3,059,019  10/1962  Ringold _____ 260—586 X
3,444,188   5/1969  Knox _____ 260—488

ALEX MAZEL, Primary Examiner
J. H. TURNIPSEED, Assistant Examiner

U.S. Cl. X.R.

260—345.7, 347.4, 410, 456, 463, 468, 473, 487, 488, 586